United States Patent Office 3,422,273
Patented Jan. 14, 1969

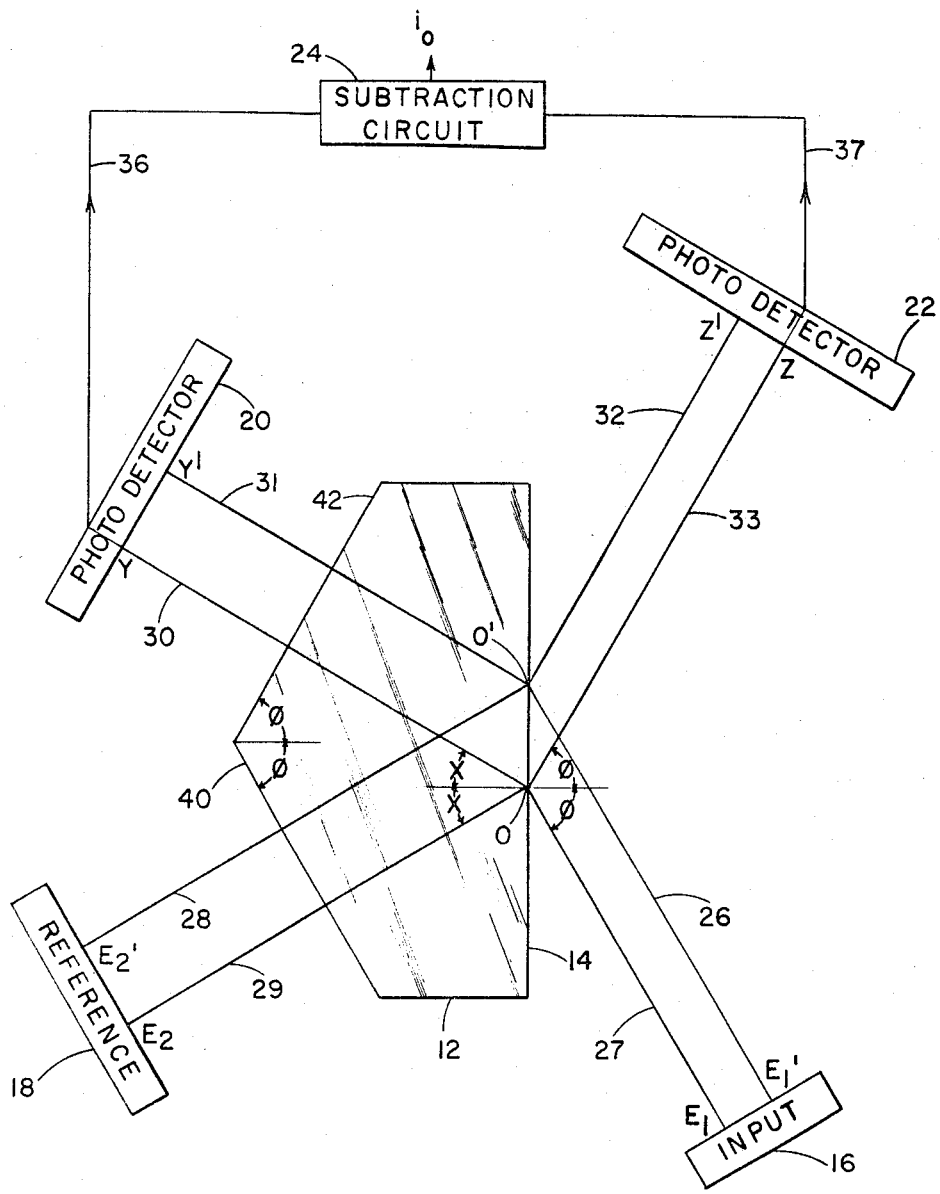

3,422,273
OPTICAL DEVICE
George A. Biernson, Concord, Mass., assignor to Sylvania Electric Products Inc., a corporation of Delaware
Filed Jan. 2, 1964, Ser. No. 335,015
U.S. Cl. 250—220     12 Claims
Int. Cl. H01j 39/12

ABSTRACT OF THE DISCLOSURE

An optical magic tee including a solid prism of specified index of refraction and having three plane faces oriented to receive and transmit incident light beams and their reflections and refractions. A first light beam is directed externally of the prism to one plane face and a second light beam is directed internally of the prism to the same face, the angles of incidence being adjusted to cause the reflected wave of each incident beam to coincide with the refracted wave of the other incident beam, these coincident waves being the output beams. An optical balanced mixer is provided by detecting each output beam and subtracting one from the other to produce an output signal representative of the product of the input beams.

---

This invention is concerned with a device for combining optical waves and more particularly with a device for accomplishing at optical frequencies the function accomplished by the magic tee at microwave frequencies, and the application of such a device to a balanced optical mixer.

A microwave tee is a component having a straight piece of waveguide with another piece joined to it at right angles. The junction is open so that energy fed into any arm sees two possible paths at the junction. When the component has both an E arm and an H arm at the same point in the main line, it is called a hybrid tee and the two main line terminals are called side arms. When properly matched, the tee has special properties and is called a magic tee. In this device, energy fed into the E arm or the H arm divides equally in the other two arms and there is no coupling between the E and H arms. Energy fed into one side arm divides equally between the E and H arms, and there is no coupling to the other side arm. When energy is fed into both side arms, the algebraic sum of the signal intensities appears at the H arm and the difference appears at the E arm.

The magic tee is a very useful microwave device and has been used in microwave systems for such applications as impedance bridges, balanced mixers, balanced duplexers and microwave discriminators. Further explanation and discussion of the magic tee may be found in "Principles of Microwave Circuits," Massachusetts Institute of Technology Radiation Laboratory Series, volume 8, by C. G. Montgomery, R. H. Dicke, and E. M. Purcell, at p. 306.

It is desirable to have devices that provide at optical frequencies the equivalent function of a microwave magic tee for use in laser systems that employ coherent optical signals. The major problem of applying the magic tee principle at optical frequencies is that very high dimensional accuracies are required to maintain phase coherence in the optical signals.

Accordingly, it is an object of the present invention to provide an optical magic tee.

It is a further object to provide a technique for satisfying the requirements of high dimensional accuracy to permit performance of the magic tee function at optical frequencies.

A still further object is to provide a balanced optical mixer for performing coherent detection by multiplying a received optical coherent signal with a reference optical coherent signal and to filter the result in a difference amplifier or subtraction circuit.

Briefly, these and other objects are accomplished in one embodiment of the invention wherein a solid body of dielectric material is of a given thickness and has three plane faces in the direction of the thickness for receiving and directing incident light beams and their reflections and refractions.

A first optical beam is directed externally to a first plane face and a second optical beam is directed internally to the same are of the same face through a second plane face, both beams being in a common plane of incidence perpendicular to the first plane face of the dielectric body. Emerging externally from the common area of incidence is a first output ray and internally a second output ray. The second ray emerges through a third plane face, oriented perpendicularly to the internal output ray. The function of the magic tee at optical frequencies is thereby performed. The magic tee described above is used in a balanced mixer by feeding both of the said outputs to photodetectors, which are oriented so that the number of optical wave lengths between the common area of incidence in the plane face and the photodetector for the external output ray is approximately equal to the number of optical wave lengths between the common area of incidence and the photodetector for the internal output ray. The output signals from the photodetectors are subtracted to produce an output signal proportional to the product of the signals of the two input waves.

Other objects, features, and advantages of the invention will be apparent from the following description and reference to the accompanying drawings, the single figure of which is a system diagram of a balanced optical mixer using an optical magic tee according to the invention.

An optical magic tee mixes two input optical plane waves of limited cross section to form two output plane waves of limited cross section. If the input plane waves are independent, so that interference effects do not occur, the power in each input plane wave splits evenly into the two output plane waves. Assuming that the two input plane waves are linearly polarized, the electric field vectors $\vec{E}_1(t)$ and $\vec{E}_2(t)$ at particular points within these two input plane waves can be expressed as follows:

$$\text{Wave (1)}: \vec{E}_1(t) = (1/\sqrt{n_1 A_1})\vec{u}_1 V_1(t+T_1) \quad (1)$$

$$\text{Wave (2)}: \vec{E}_2(t) = (1/\sqrt{n_2 A_2})\vec{u}_2 V_2(t+T_2) \quad (2)$$

where $\vec{u}_1, \vec{u}_2$ = unit vectors in direction of electric fields of two polarized input plane waves
$V_1, V_2$ = time varying optical-frequency signals of two input waves
$A_1, A_2$ = cross section areas of two input waves
$n_1, n_2$ = indices of refraction of media in which input waves are propagating
$T_1, T_2$ = time-delay constants
$t$ = time The electrical field vector is assumed to be constant across the cross section of each wave and the optical magic tee combines the two input plane waves to form two output plane waves, which are also linearly polarized and of limited cross sectional area. The electric field vectors $\vec{E}_3(t)$ and $\vec{E}_4(t)$ at particular points within the two output optical waves can be expressed as follows:

$$\text{Wave (3)}: \vec{E}_3(t) = (1/\sqrt{2n_3 A_3})\vec{u}_3[V_1(t+T_3) + V_2(t+T_3)] \quad (3)$$

Wave (4): $\vec{E}_4(t) = (1/\sqrt{2n_4A_4})\vec{u}_4[V_1(t+T_4) - V_2(t+T_4)]$  (4)

where $\vec{u}_3, \vec{u}_4$ = unit vectors in directions of electric fields of two polarized output plane waves
$A_3, A_4$ = cross section areas of two output waves
$n_3, n_4$ = indices of refraction of media in which output waves are propagating
$T_3, T_4$ = time-delay constants These field vectors are also constant across the cross sections of the waves, and by appropriate choice of the positions of the points along the ray paths at which the electric field vectors $\vec{E}_1, \vec{E}_2, \vec{E}_3, \vec{E}_4$, are measured, the time parameters can be set so that $T_1 = T_2$ and $T_3 = T_4$. The time variable can therefore arbitrarily be defined so that $T_1 = T_2$ and $T_3 = T_4 = 0$. Equations 1, 2, 3, and 4 then reduce to the following:

$$\vec{E}_1(t) = (1/\sqrt{n_1A_1})\vec{u}_1V_1(t+T) \quad (5)$$

$$\vec{E}_2(t) = (1/\sqrt{n_2A_2})\vec{u}_2V_2(t+T) \quad (6)$$

$$\vec{E}_3(t) = (1/\sqrt{2n_3A_3})\vec{u}_3[V_1(t) + V_2(t)] \quad (7)$$

$$\vec{E}_4(t) = (1/\sqrt{2n_4A_4})\vec{u}_4[V_1(t) - V_2(t)] \quad (8)$$

In the preceding analysis, it has been assumed that only linearly polarized signals are applied to the magic tee. Since a non-polarized wave is the sum of linearly polarized waves, polarized perpendicular to each other, the magic tee, if adjusted to operate with both polarizations, can operate with a non-polarized wave. For such a magic tee the electric field vectors given in Equations 5, 6, 7, and 8 are generalized to appear as follows, where A and B refer to the two polarization components:

$$\vec{E}_1(t) = (1/\sqrt{n_1A_1})\{\vec{u}_{1A}V_{1A}(t+T) + \vec{u}_{1B}V_{1B}(t+T)\} \quad (9)$$

$$\vec{E}_2(t) = (1/\sqrt{n_2A_2})\{\vec{u}_{2A}V_{2A}(t+T) + \vec{u}_{2B}V_{2B}(t+T)\} \quad (10)$$

$$\vec{E}_3(t) = (1/\sqrt{2n_3A_3})\{\vec{u}_{3A}[V_{1A}(t) + V_{2A}(t)] + \vec{u}_{3A}[V_{1B}(t) + V_{2B}(t)]\} \quad (11)$$

$$\vec{E}_4(t) = (1/\sqrt{2n_4A_4})\{\vec{u}_{4A}[V_{1A}(t) - V_{2A}(t)] + \vec{u}_{4B}[V_{1B}(t) - V_{2B}(t)]\} \quad (12)$$

where $\vec{u}_{1A}, \vec{u}_{2A}, \vec{u}_{3A}, \vec{u}_{4A}$ = unit vectors for waves (1), (2), (3), and (4) corresponding to polarization (A)
$\vec{u}_{1B}, \vec{u}_{2B}, \vec{u}_{3B}, \vec{u}_{4B}$ = unit vectors for waves (1), (2), (3) and (4) corresponding to polarization (B)
$V_{1A}, V_{2A}$ = optical-frequency signals for waves (1) and (2) corresponding to polarization (A)
$V_{1B}, V_{2B}$ = optical-frequency signals for waves (1) and (2) corresponding to polarization (B)

An important use for an optical magic tee is in a balanced optical mixer. The output waves according Equations 3 and 4 are fed to photodetectors, and the output signals from the photodetectors are subtracted. A photodetector provides an output signal, usually a current, which is proportional to the input optical power. The output signal, $i_o$, can be expressed in terms of the field intensity at the surface of the detector according to the following equation:

$$i_o = K_p n A [/E/^2] \quad (13)$$

where $[/E/^2]$ = square of instantaneous magnitude of field intensity at surface of detector, smoothed to remove frequency components at optical frequencies and above
$A$ = cross-section area of wave at detector
$n$ = index of refraction of medium in which wave is propagating
$K_p$ = sensitivity constant for photodetector It is assumed that the field vector E is constant across the surface of the photodetector.

Assuming that the two photodetectors have the same sensitivity constant and are placed in the paths of the output waves denoted by Equations 3 and 4 at the points in which vectors $\vec{E}_3$ and $\vec{E}_4$ are measured, and applying Equation 13 to Equations 11 and 12, the output signals $i_{c3}$ and $i_{o4}$ from the two photodetectors are in accordance with the following equations:

Wave (3): $i_{o3}(t) = (K_p/2) < [V_1(t) + V_2(t)]^2 >$  (14)
Wave (4): $i_{o4}(t) = (K_p/2) < [V_1(t) - V_2(t)]^2 >$  (15)

The symbol $<>$ indicates that the components at optical frequency and above are removed. Multiplying these expressions gives $$i_{o3}(t) = K_p/2 [<V_1^2(t)> + <V_2^2(t)> + 2<V_1(t)V_2(t)>] \quad (16)$$

$$i_{o4}(t) = (K_p/2)[<V_1^2(t)> + <V_2^2(t)> - 2<V_1(t)V_2(t)>] \quad (17)$$

The output signals $i_{o3}$ and $i_{o4}$ from the photodetectors are subtracted to form the balanced-mixer output signals $i_o$, which is thus equal to $$i_o(t) = i_{o3}(t) - i_{o4}(t) = 2K_p<V_1(t)V_2(t)> \quad (18)$$

Thus, the balanced mixer output signal $i_o$ is proportional to the product of the signals $V_1(t), V_2(t)$ of the two input waves, filtered to remove the high-frequency components.

The process of multiplying two signals together and filtering is equivalent mathematically to cross-correlation, so that the balanced optical mixer cross-correlates the signals for the two input waves. In an optical radar application, one of these waves represents the echo signal from the target and the other represents a coherent local oscillator reference signal. Cross-correlated, these two signals perform a heterodyning process which allows the receiver to achieve much higher sensitivity. Such a radar has been discussed in an article entitled "Requirements of a Coherent Laser Pulse-Doppler Radar," by G. Biernson and R. F. Lucy, Proceedings of the IEEE, volume 51, number 1, January 1963, p. 202.

As shown in Equations 16 and 17, the separate photodetectors supply the cross-correlation signal $$<V_1(t)V_2(t)>$$

but it is corrupted with unwanted components $<V_1^2(t)>$ and $<V_2^2(t)>$. The balancing operation in the balanced mixer cancels out these unwanted components.

To construct a magic tee at optical frequencies and apply it in a balanced optical laser requires accurate control of phase. The required accuracy is very difficult if not impossible to achieve in many configurations that one might use. For example, B. M. Oliver in an article entitled "Signal-To-Noise Ratios In Photoelectric Rays," Proceedings of the IRE, volume 49, December 1961, p. 1960, discussed the construction of an optical magic tee using half-silvered mirrors. However, it is difficult to control phase with the half-silvered mirror. Higher accuracy is achieved by combining the optical waves on the plane face of a dielectric body, since the plane face of a dielectric can be polished to very high accuracy.

Referring now to the figure, a balanced optical mixing system is shown as comprising a solid dielectric body 12 having a plane face 14 in the direction of its thickness and two other plane faces for admitting and guiding the waves, a source 16 of a coherent input optical beam 26, 27, a source 18 of a coherent reference optical signal 28, 29, first and second photodetectors 20 and 22, and a subtraction circuit 24, the output of which is a multiple of the input waves. The optical wave 26, 27, is directed externally against plane face 14 of the dielectric body 12, and the optical wave 28, 29 is directed internally against the same area of the face 14. Both beams are in the same plane of incidence, which is perpendicular to the face 14 of the dielectric body, and each are about ¼ inch in diameter.

The angle of incidence of beam 26, 27 is $\phi$ and of beam 28, 29 is $x$, these angles being adjusted such that the power in each input beam splits evenly into reflected and refracted waves. The angles are adjusted when one beam at a time is directed to the dielectric body, so that interference effects do not occur. For the angles of incidence $\phi$ and $x$, the reflected wave due to incident beam 26, 27 coincides with the refracted wave due to incident beam 28, 29 to form wave 32, 33; and the refracted wave due to incident beam 26, 27, coincides with the reflected wave due to incident beam 28, 29 to form wave 30, 31, provided either that both beams are linearly polarized perpendicularly or parallel to the plane of incidence, or that the index of refraction of the dielectric is given by the following equation:

$$n_d = n_o \sqrt{3 + 2\sqrt{2}} \quad (19)$$

where $n_o$ is the index of refraction of the material surrounding the dielectric body, which is unity if that material is air. Numerically the value for $n_d$ given in Equation 19 is 2.41 $n_o$, and a material such as zinc sulfide with a refractive index of 2.37 would be satisfactory.

For the index of refraction $n_d$ given in Equation 19, the required angles of incidence are given by the following relationship:

$$\sin^2 \phi = \cos^2 x = (1 + \sqrt{2})/2\sqrt{2} \quad (20)$$

Numerically these angles are equal to: $\phi = 67.5°$ and $x = 22.5°$. If the index of refraction of the dielectric has the value given in Equation 19 and the angles of incidence are set in accordance with Equation 20, the magic tee will operate with non-polarized light.

If the index of refraction $n_d$ is not equal to 2.41$n_o$, the optical beams must be linearly polarized if a perfect match in the magic tee is to be achieved. If the beams are polarized perpendicularly to the plane of incidence, the required angles of incidence $x$ and $\phi$ are given by the solutions of the following equations:

$$\cos^2 x = \left[\frac{n_d^2 - n_o^2}{n_d^2}\right]\left[\frac{3 + 2\sqrt{2}}{4\sqrt{2}}\right] \quad (21)$$

$$\sin^2 \phi = [(3 + 2\sqrt{2}) - (n_d/n_o)^2(3 - 2\sqrt{2})]/4\sqrt{2} \quad (22)$$

If the beams are polarized parallel to the plane of incidence, the required angles of incidence are given by the solutions of the following equations:

$$\cos^2 x = \left[\frac{n_d^2 - n_o^2}{n_d^2}\right]\frac{(17 + 12\sqrt{2})n_d^4 n_o^4 - n_d^8}{34 n_d^4 n_o^4 - n_d^8 - n_o^8} \quad (23)$$

$$n_o \sin \phi = n_d \sin x \quad (24)$$

The figure shows the magic tee with a ray 27 of the optical beam 26, 27 and a ray 29, representing the corresponding ray of optical beam 28, 29, intersecting the face 14 of the dielectric at the same point O. An external ray OZ and an internal ray OY emerge from point O, and these rays are fed to photodetectors 22 and 20, respectively. The photodetectors are oriented so that the number of optical wave lengths between points O and Z is equal to the number of optical wave lengths between points O and Y. In like manner, ray 26 represents a second ray of the optical beam 26, 27 and ray 28 represents the corresponding ray of optical beam 28, 29, intersecting the face 14 of the dielectric at the same point O'. Emerging from the point O' is an external ray O'Z' and an internal ray O'Y', which are fed to photodetectors 22 and 20. The photodetectors are oriented so that the number of optical wave lengths between a phase front of optical beam 26, 27 and the photodetectors is the same for rays 26 and 27; and the number of optical wave lengths between a phase front of optical beam 28, 29 and the photodetectors is approximately the same for rays 28 and 29. It has been found that the optical surface of the photodetectors is relatively non-critical, as far as optical tolerance is concerned, and that the number of optical wavelengths from the plane face 14 to photodetector 22 need only be approximately equal to the number of optical wavelengths between the plane face and photodetector 20. The photodetector outputs 36 and 37 are fed to the subtraction circuit 24 to produce the desired multiplication of the inputs $i_o$.

In a practical embodiment of the invention reflections are minimized at faces 40 and 42 of the dielectric by making face 40 perpendicular to the direction of propagation of optical beam 28, 29, and orienting face 42 perpendicularly to the direction of propagation of optical rays 30 and 31. Reflections are further minimized by coating faces 40 and 42 with non-reflecting material, which is tuned to the frequencies of the optical waves.

Although preferred and illustrative embodiments have been shown and described, modifications will occur to ones skilled in the art. It is the intention, therefore, that the invention not be limited by the features shown and described except as such limitations appear in the following claims.

What is claimed is:

1. For a balanced mixer for mixing a first coherent light signal with a second coherent light signal, a device comprising: a first coherent signal source, a second coherent signal source and a body of dielectric material of refractive index $$\sqrt{3 + 2\sqrt{2}}$$

having a plane face for receiving the first signal and for performing the magic tee function at optical frequencies; means on said body for receiving the second signal, said first signal having an angle of incidence relative to the normal to said plane face of approximately 67.5 degrees, and said second signal having an angle of incidence relative to the normal to said plane face of approximately 22.5 degrees, so that the second signal is incident to the internal side of said plane face at the same point as said first signal is incident to the external side of said plane face, both signals being in the same plane of incidence, their areas of incidence coinciding, said angles causing the reflected light wave of said first signal to be equal in power to its refracted wave and to coincide with the refracted light wave of said second signal to produce a first resulting wave external to said dielectric material, and causing the reflected light wave of said second signal to be equal in power to its refracted wave and to coincide with the refracted light wave of said first signal to produce a second resulting wave, which is internal to said dielectric; and means for transmitting said second resulting wave from said dielectric body.

2. For a balanced mixer for mixing a first perpendicularly polarized coherent light signal with a second perpendicularly polarized coherent light signal, a device comprising: a first coherent signal source, a second coherent signal source and a body of dielectric material of refractive index $n_d$ having a plane face for receiving the first signal and for performing the magic tee function at optical frequencies; means on said body for receiving the second signal, said first signal having an angle of incidence relative to the normal to said plane face of $\phi$ degrees, and said second signal having an angle of incidence relative to the normal to said plane face of approximately $x$ degrees, said angles $\phi$ and $x$ bearing a relation to $n_d$ as follows:

$$\cos^2 x = \left[\frac{n_i^2 - n_o^2}{n_d^2}\right] \frac{3 + 2\sqrt{2}}{4\sqrt{2}}$$

$$\sin^2 \phi = \frac{(3 + 2\sqrt{2}) - \left(\frac{n_i}{n_o}\right)^2 (3 - 2\sqrt{2})}{4\sqrt{2}}$$

where $n_o$ is the index of refraction of the medium which surrounds the dielectric body, said second signal being incident to the internal side of said plane face at the same point as said first signal is incident to the external side of said plane face, both signals being in the same plane of incidence, so that their areas of incidence coincide, said angles causing the reflected light wave of said first signal to be equal in power to its refracted wave and to coincide with the refracted light wave of said second signal to produce a first resulting wave external to said dielectric material, and causing the reflected light wave of said second signal to be equal in power to its refracted wave and to coincide with the refracted light wave of said first signal to produce a second resulting wave, which is internal to said dielectric, and means for transmitting said second resulting wave from said dielectric body.

3. For a balanced mixer for mixing a first polarized coherent light signal with a second polarized coherent light signal, a device comprising: a first coherent signal source, a second coherent signal source and a body of dielectric material of refractive index $n_d$ having a plane face for receiving the first signal and for performing the magic tee function at optical requencies, means on said body for receiving the second signal, said first signal having an angle of incidence relative to the normal to said plane face of $\phi$ degrees, and said second signal having an angle of incidence relative to the normal to said plane face of approximately $x$ degrees, said angles and $x$ bearing a relation to $n_d$ as follows:

$$\cos^2 x = \left[\frac{n_d^2 - n_o^2}{n_d^2}\right] \frac{(17 + 12\sqrt{2})n_d^4 n_o^4 - n_d^8}{34 n_d^4 n_o^4 - n_d^8 - n_o^8}$$

$$\sin x = \frac{\sin \phi n_o}{n_d}$$

where $n_o$ is the index of refraction of the medium which surrounds the dielectric body, said second signal being incident to the internal side of said plane face at the same point as said first signal is incident to the external side of said plane face, both signals being in the same plane of incidence and polarized parallel to that plane, so that their areas of incidence coincide, said angles causing the reflected light wave of said first signal to be equal in power to its refracted wave and to coincide with the refracted light wave of said second signal to produce a first resulting wave external to said dielectric material, and causing the reflected light wave of said second signal to be equal in power to its refracted wave and to coincide with the refracted light wave of said first signal to produce a second resulting wave, which is internal to said dielectric, and means for transmitting said second resulting wave from said dielectric body.

4. A balanced mixer for mixing an unpolarized incident signal with an unpolarized coherent reference light signal, comprising: an incident signal source and a coherent reference signal source; first and second matched photodetectors; a prism formed of a material having a refractive index of $$\sqrt{3 + 2\sqrt{2}}$$

and having first and second faces, the first face for receiving the incident signal at an angle displaced approximately 67.5 degrees from the normal, said second face for receiving the reference signal, said reference signal being in the same plane of incidence as said incident signal and intersecting said second face at an angle to permit intersection of said first face at the same point as said incident signal, said angles causing the reflected light wave of said incident signal to be equal in power to its refracted wave and to coincide with the refracted light wave of said reference signal to produce a first resulting wave, which is incident to said first photodetector, and causing the reflected light wave of said reference signal to be equal in power to its refracted wave and to coincide with the refracted light wave of said incident signal to produce a second resulting wave, which is incident to said second photodetector, a subtraction circuit operative in response to signals from said photodetectors to produce an output signal proportional to the product of said incident signal and said reference signal.

5. A balanced mixer for mixing a polarized incident light signal with a polarized coherent reference light signal, comprising: an incident signal source and a coherent reference signal source, first and second matched photodetectors; a prism formed of material having a refractive index of $n_d$ and having first and second faces, the first face for receiving the incident signal at an angle displaced $\phi$ degrees from the normal, said second face for receiving the reference signal at an angle displace $x$ degrees from the normal, said angle $x$ bearing a relation to $n_d$ as follows when the incident and reference signals are polarized perpendicular to the plane of incidence for the signal:

$$\cos^2 x = \left[\frac{n_d^2 - n_o^2}{n_d^2}\right] \frac{3 + 2\sqrt{2}}{4\sqrt{2}}$$

said angle $\phi$ bearing a relation to $n_d$ as follows:

$$\sin^2 \phi = \frac{(3 + 2\sqrt{2}) - \left(\frac{n_d}{n_o}\right)^2 (3 - 2\sqrt{2})}{4\sqrt{2}}$$

where $n_o$ is the index of refraction of the medium which surrounds the dielectric body, said reference signal being in the same plane of incidence as said incident signal and being incident to the internal side of said first face at the same point as said incident signal, said angles causing the reflected light wave of said incident signal to be equal in power to its refracted wave and to coincide with the refracted light wave of said reference signal to produce a first resulting wave, which is incident to said first photodetector, and causing the reflected light wave of said reference signal to be equal in power to its refracted wave and to coincide with the refracted light wave of said incident signal to produce a second resulting wave which is incident to said second photodetector, a subtraction circuit operative in response to signals from said photodetectors to produce an output signal proportional to the product of said incident signal and said reference signal.

6. A balanced mixer for mixing a polarized incident light signal with a polarized coherent reference light signal, comprising: an incident signal source and a coherent reference signal source, first and second matched photodetectors; a prism formed of material having a refractive index of $n_d$ and having first and second faces, the first face for receiving the incident signal at an angle displaced $\phi$ degrees from the normal, said second face for receiving the reference signal at an angle displaced $x$ degrees from the normal, said angle $x$ bearing a relation to $n_d$ as follows when the incident and reference signals are polarized parallel to the plane of incidence for the signal:

$$\cos^2 x = \left[\frac{n_d^2 - n_o^2}{n_d^2}\right] \frac{(17 + 12\sqrt{2})n_d^4 n_o^4 - n_d^8}{34 n_d^4 n_o^4 - n_d^8 - n_o^8}$$

said angle $\phi$ bearing a relation to said angle $x$ as follows:

$$\sin x = \frac{\sin \phi n_o}{n_d}$$

where $n_o$ is the index of refraction of the medium which surrounds the dielectric body, said reference signal being in the same plane of incidence as said incident signal and being incident to the internal side of said first face at the same point as said incident signal, said angles causing the reflected light wave of said incident signal to be equal in power to its refracted wave and to coincide with the refracted light wave of said reference signal to produce a first resulting wave, which is incident to said first photodector, and causing the reflected light wave of said reference signal to be equal in power to its refracted wave and to coincide with the refracted light wave of said incident signal to produce a second resulting wave, which is incident to said second photodetector a subtraction circuit operative in response to signal from said photodetectors to produce an output signal proportional to the product of said incident signal and said reference signal.

7. An optical magic tee comprising: a first coherent light source, a second coherent light source and a prism having a specified refractive index and a plane face for receiving externally of said prism a first coherent light beam and internally of said prism a second coherent light beam, said first and second beams being in a common plane of incidence perpendicular to said plane face and intersecting said plane face in a coincident area, the angles of incidence of said first and second beams with resepct to said prism being adjusted to cause the reflected light wave of said first beam to be equal in power to its refracted wave and to coincide with the refracted light wave of said second beam to produce a first output beam external to said prism, and to cause the reflected light wave of said seocnd beam to be equal in power to its refracted wave and to coincide with the refracted light wave of said first beam to produce a second output beam internal to said prism, and means for transmitting said second output beam from said prism.

8. The invention according to claim 7 wherein said prism includes a second face operative to admit said second light beam into said prism, and said means includes a third face of said prism operative to transmit said second output beam from said prism.

9. The invention according to claim 8 wherein said second and third prism faces are oriented perpendicularly to the respective second light beam and second output beam.

10. The invention according to claim 7 further including a first and a second photodetector each operative to receive the respective first and second output beams and each oriented a substantially equal number of wavelengths from the coincident area of said plane face, and a subtraction circiut operative in response to signals from said photodetectors to produce an output signal proportional to the product of said first and second light beams.

11. The invention according to claim 7 wherein said first and second light beams are both polarized parallel to said plane of incidence.

12. The invention according to claim 7 wherein said first and second light beams are both polarized perpendicular to said plane of incidence.

References Cited

UNITED STATES PATENTS 3,191,047  6/1965  Oliver _____ 331—94.5

OTHER REFERENCES

Oliver: "Signal-to-Noise Ratios in Photoelectric Mixing," Proceedings of the IRE, volume 49, No. 12, December 1961, pp. 1960 and 1961.

JEWELL H. PEDERSEN, *Primary Examiner.*

F. L. EVANS, *Assistant Examiner.*

U.S. Cl. X.R.

88—1, 14; 350—286